United States Patent Office 2,809,147
Patented Oct. 8, 1957

2,809,147

INSECTICIDAL FILM-FORMING COMPOSITION AND METHOD OF MAKING SAME

Irwin Hornstein, East Riverdale, Md., and William N. Sullivan, Washington, D. C., dedicated to the public No Drawing. Application June 15, 1954,
Serial No. 437,015

15 Claims. (Cl. 167—42)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

The patent rights for the United States in any invention in the patent to be granted on this application are dedicated to the public.

The present application is a continuation-in-part of Serial No. 340,934, filed March 6, 1953, now abandoned.

In the foregoing application there are disclosed insecticidal compositions of increased effectiveness and durability which are obtained by preparing a solid solution of lindane or DDT in a solid film-forming mixture of isomeric chlorinated terphenyls. This reproducible chlorinated terphenyl mixture containing 60% chlorine by weight is commercially available from the Monsanto Chemical Company, and is designated as Aroclor 5460. Throughout the remainder of the description which follows this material will be referred to simply as Aroclor.

It has now been found that Aroclor is particularly effective in increasing the effectiveness and durability of insecticide coatings in which the active ingredient of such coatings is a relatively volatile chlorinated organic insecticide.

Among these volatile organic insecticides are "aldrin" the major constituent of which is 1,2,3,4,10,10-hexachloro-1,4,4a,5,8,8a-hexahydro-1,4-endo, exo - 5,8 - dimethanonaphthalene; "heptachlor" which is 1,4,5,6,7,8,8-heptachloro-3a,4,7,7a-tetrahydro-4,7-methanoindene; and "lindane" esentially the gamma isomer of 1,2,3,4,5,6-hexachlorocyclohexane. Throughout the remainder of this description these insecticides will also be referred to by their trivial names, i. e. aldrin, heptachlor, lindane.

These insecticidal mixtures are useful for both indoor and outdoor application. When applied indoors, in addition to prolonging the effectiveness of the insecticide the unpleasant appearance of a heavy, white, insecticidal deposit is completely avoided; instead the residue is a practically invisible, transparent solid solution of the pesticide in Aroclor. When applied outdoors, residual deposits remarkably resistant to weathering are obtained.

The properties of Aroclor that make it uniquely suitable for use with the volatile chlorinated organic insecticides are as follows:

(1) It is a film-forming, adherent, water-insoluble, low molecular weight material.

(2) It is an excellent solvent for lindane, aldrin, heptachlor, etc. The insecticide may be present to the extent of 100% the weight of Aroclor.

(3) It is inert, resistant to oxidation, non-flammable, and does not afford a medium for fungus growth. Once the insecticide-containing film has been deposited, and the solvent evaporated, no further change in the physical properties of the film is to be expected.

(4) Aroclor has an extremely low vapor pressure and its vaporization rate is negligible.

(5) Mixtures varying from 1:1 to 1:10 of insecticide and Aroclor by weight provides a residual surface that is very slightly tacky. Insects walking over such a surface pick up the insecticide more readily than when they travel across a hard surface.

The insecticides are incorporated into the film by dissolving Aroclor and the insecticide in a mutual low-boiling solvent, preferably a chlorinated organic solvent such as methylene chloride, methylchloroform or ethylenedichloride or in a ketone such as methylethylketone. Mixtures of this kind can then be applied as a solution or an emulsion by dipping, painting, spraying, as an aerosol, or as a wettable powder or dust.

These compositions are particularly useful in the application of residual insecticide coatings to porous surfaces and outdoor foilage. Very concentrated solutions of a mixture of an insecticide such as lindane and Aroclor are prepared by dissolving both in a suitable low-boiling solvent. This solution may be sprayed using conventional equipment. Once the particles emerge from the spray nozzle, only a small amount of solvent can evaporate before a tiny plastic sphere, about 100 microns in diameter is formed. The particle size is a function among other factors of type of nozzle, and pressure, and is therefore controllable. This method of application gives excellent dispersion and coverage. The spheres adhere tenaciously to the surfaces on which they deposit without penetration. Control of particle size and non-penetration of insecticide are of extreme importance, and "plastic-sphere" applications are many.

These new insecticidal materials, because of their appearance and residual effect have a wide variety of application. Some of the many uses involve control of larvae and adults of the housefly and mosquito, control of house flies on cattle, control of household insects in military hospitals and mess halls.

These new materials also give increased persistence to insecticides on field crops, ornamentals, and outdoor foliage in general. They are also useful as a pesticidal treatment for storage bins and sacks and, because of the water insolubility, for the contol of aquatic insects attacking piers.

EXAMPLES

I 1.0 part by weight of aldrin and 1.0 part by weight of Aroclor were dissolved in 6.7 parts by weight of methylethylketone. The solution was applied to pine foliage outdoors at the rate of 1.8 pounds per acre. After 60 days, house flies exposed to the treated foliage still showed 100% mortality. 1.0 part by weight of aldrin alone dissolved in 6.7 parts by weight of methylethylketone and then applied in an identical manner to pine foliage at a rate of 2.1 lbs. per acre gave only a 5% kill against house flies after 10 days.

II 1.5 parts by weight of lindane and 3.0 parts by weight of Aroclor were dissolved in 150 parts by weight of ethylene dichloride; 20 grams of this solution when poured on a one square foot panel of aluminum gave a deposit which after evaporation of the solvent showed no sign of crystallization and was a clear transparent film. After 90 days this surface still gave 66 percent kill against American cockroaches and 100 percent kill against Japanese beetles. An equal amount of lindane was ineffective after 10 days.

III

Five parts by weight of lindane, 5 parts by weight of Aroclor, 50 parts by weight of methylene chloride and 40 parts by weight of Freon-12 (dichlorodifluoromethane)

were applied as a pressurized spray. Applications on non-porous and porous surfaces were effective against American cockroaches, Japanese beetles, and house flies.

IV 1.0 part by weight of heptachlor and 1.0 part by weight of Aroclor were dissolved in 6.7 parts by weight of methylethylketone. The insecticidal mixture was applied to outdoor pine foliage. After 30 days house flies exposed to the treated foliage suffered 100% mortality while heptachlor alone after similar outdoor exposure gave zero mortality.

V

An emulsion containing an emulsifying agent that readily decomposed after outdoor application, thus minimizing reemulsification after rainfall, consists of the following:

35 parts by weight of lindane
35 parts by weight of Aroclor
80 parts by weight of methyl ethyl ketone
100 parts by weight of water
½ part by weight of ammonium oleate After 44 days an initial deposit of 2.0 lbs. per acre gave 96 percent kill against house flies. A standard lindane emulsion applied in a similar manner after 9 days gave 2 percent kill.

VI 1,000 parts by weight of lindane and 1,000 parts by weight of Aroclor were dissolved in 1,750 parts by weight of methylethylketone. This concentrated solution was dispersed using a mist-blower in a wind of 20 miles per hour. Deposition began 20 feet from the mist-blower, peaked at 110 feet, was 30 percent of peak at 300 feet and there was sufficient deposit to kill insects at 400 feet. The deposit consisted of small plastic-like spheres about 100 microns in size that gave excellent dispersion and coverage. This deposit was still giving excellent control after one month.

VII 1,000 parts by weight of aldrin and 1,000 parts by wight of Aroclor were dissolved in 3,300 parts by weight of methylchloroform and sprayed out at 50 pounds per square inch pressure. Small plastic-like spheres were produced that gave excellent coverage and dispersal. The deposits were still toxic after one month. The use of this non-flammable solvent is of particular value for aircraft spraying.

We claim:

1. An insecticidal composition comprising a chlorinated hydrocarbon insecticide and a film forming chlorinated terphenyl.
2. An insecticidal composition comprising a chlorinated hydrocarbon insecticide, a film forming chlorinated terphenyl, and a solvent.
3. An insecticidal composition comprising a film forming chlorinated terphenyl and a member of the group consisting of aldrin, lindane, and the heptachlor.
4. An insecticidal composition comprising a film forming chlorinated terphenyl, a member of the group consisting of aldrin, lindane, and heptachlor and a solvent.
5. An insecticidal composition comprising aldrin and a film forming chlorinated terphenyl.
6. An insecticidal composition comprising lindane and a film forming chlorinated terphenyl.
7. An insecticidal composition comprising heptachlor and a film forming chlorinated terphenyl.
8. The method of claim 15 in which the insecticide is aldrin.
9. The method of claim 15 in which the insecticide is lindane.
10. The method of claim 15 in which the insecticide is heptachlor.
11. A method for producing an insecticide coating of enhanced durability and effectiveness on a surface which comprises dissolving a chlorinated hydrocarbon insecticide and a film forming chlorinated terphenyl in a low-boiling organic solvent, coating a surface with the so-formed solution, and then permitting the solvent to evaporate to produce a film on the surface of a solid solution of the insecticide in the chlorinated terphenyl.
12. A method for producing an insecticide coating of enhanced durability and effectiveness on a surface which comprises dissolving in a low-boiling organic solvent a chlorinated hydrocarbon insecticide selected from the group consisting of aldrin, lindane and heptachlor and a mixture of film forming isomeric chlorinated terphenyls containing about 60% chlorine by weight, coating a surface with the so-formed solution, and then permitting the solvent to evaporate to produce a film on the surface of a solid solution of the insecticide in the isomeric chlorinated terphenyls.
13. A method for producing an insecticide coating of enhanced durability and effectiveness on a surface which comprises dissolving a chlorinated hydrocarbon insecticide and a film forming chlorinated terphenyl in a low-boiling organic solvent and spraying a mist of the so-formed solution at a surface from a distance sufficient to permit a portion of the solvent to evaporate and form plastic spheres before depositing on the surface.
14. A method for increasing the effectiveness and durability of deposits of chlorinated hydrocarbon insecticides which comprises incorporating said chlorinated hydrocarbon insecticide in a film-forming chlorinated terphenyl to form a coating comprising a solid solution of the insecticide in the chlorinated terphenyl.
15. A method for increasing the effectiveness and durability of deposits of insecticides of the group consisting of aldrin, lindane, and heptachlor which comprises incorporating said insecticide in a film-forming chlorinated terphenyl to form a coating comprising a solid solution of the insecticide in the chlorinated terphenyl.

References Cited in the file of this patent

UNITED STATES PATENTS

| 2,517,930 | Ross et al. | Aug. 8, 1950 |
| 2,572,864 | Sumerford et al. | Oct. 30, 1951 |
| 2,621,163 | Coash | Dec. 9, 1952 |

FOREIGN PATENTS

| 578,206 | Great Britain | June 19, 1946 |
| 592,670 | Great Britain | Sept. 25, 1947 |

OTHER REFERENCES

Penning: Ind. and Eng. Chem., pp. 1180–2, vol. 22 (1930).